United States Patent
Prabhakar (10) Patent No.: US 12,172,522 B2
(45) Date of Patent: Dec. 24, 2024

(54) ANIMATION TO VISUALIZE WHEEL SLIP

(71) Applicant: TOYOTA MOTOR ENGINEERING & MANUFACTURING NORTH AMERICA, INC., Plano, TX (US)

(72) Inventor: Varun J. Prabhakar, Saline, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 996 days.

(21) Appl. No.: 17/015,598

(22) Filed: Sep. 9, 2020

(65) Prior Publication Data

US 2022/0072954 A1     Mar. 10, 2022

(51) Int. Cl.
  B60K 35/00   (2024.01)
  B60K 35/22   (2024.01)
  B60K 35/28   (2024.01)
  B60K 35/85   (2024.01)

(52) U.S. Cl.
  CPC .............. *B60K 35/00* (2013.01); *B60K 35/22* (2024.01); *B60K 35/28* (2024.01); *B60K 35/85* (2024.01); *B60K 2360/165* (2024.01); *B60K 2360/167* (2024.01); *B60K 2360/171* (2024.01); *B60K 2360/176* (2024.01); *B60K 2360/589* (2024.01)

(58) Field of Classification Search
  CPC .............. B60K 35/00; B60K 2370/167; B60K 2370/165; B60K 2370/589; B60K 2370/152; B60K 2370/171; B60K 2370/176

USPC ........................................................ 345/473
See application file for complete search history.

(56) References Cited

U.S. PATENT DOCUMENTS

| | | | |
|---|---|---|---|
| 6,352,318 B1 | 3/2002 | Hosomi et al. | |
| 8,753,123 B2 | 6/2014 | Takeuchi et al. | |
| 9,701,199 B2 | 7/2017 | Miuchi et al. | |
| 9,989,378 B2 | 6/2018 | Vernaleken et al. | |
| 10,018,725 B2 | 7/2018 | Liu | |
| 10,290,080 B2 | 5/2019 | Esparza Garcia et al. | |
| 10,357,715 B2 | 7/2019 | Buxton et al. | |
| 2011/0257826 A1* | 10/2011 | Yu | B60W 30/045 701/41 |
| 2015/0212106 A1* | 7/2015 | Henderson | B60W 40/11 701/1 |
| 2015/0352956 A1* | 12/2015 | Miuchi | B62D 15/0295 701/41 |
| 2016/0019807 A1 | 1/2016 | Uchida et al. | |
| 2018/0313658 A1 | 11/2018 | Matsui | |

FOREIGN PATENT DOCUMENTS

JP    2008-83184 A    4/2008
WO   WO2015/091693   *  6/2015 ............. G06T 13/20

* cited by examiner

Primary Examiner — Jin Ge
(74) Attorney, Agent, or Firm — Oblon, McClelland, Maier & Neustadt, L.L.P.

(57) ABSTRACT

A 3D animation of the response of a vehicle to forces imparted to the vehicle during conveyance thereof over a course. Sensor data are accepted by a processor that defines an instantaneous state of the vehicle. Forces imparted to the vehicle are computed from temporal changes in the state. Wheel slip is determined by the processor from the computed forces. A 3D graphical representation of the vehicle is rendered on a display as being in motion under influence of the wheel slip.

11 Claims, 6 Drawing Sheets

ANIMATION TO VISUALIZE WHEEL SLIP

BACKGROUND

Off-roading is the activity of driving or riding a vehicle on unsurfaced roads or tracks, made of materials such as sand, gravel, riverbeds, mud, snow, rocks, and other natural terrain. Types of off-roading range in intensity, from leisure drives with unmodified vehicles to competitions with customized vehicles and professional drivers. Off-roaders have been met with criticism for the environmental damage caused by their vehicles.

Vehicular wheel slip occurs when friction at the road/tire interface is overcome by other forces. For example, longitudinal slip ensues when a the rotational speed of a tire exceeds its free-rolling speed, such as when a driver attempts to accelerate beyond what the vehicle's momentum allows. Lateral slip arises when lateral force is applied to the tires, such as when cornering. In either case, wheel slip may present a loss of control over the vehicle.

Accordingly, it is one object of the present disclosure to provide methods and systems for representing the motion of a vehicle on a course, such as an off-road course, in a 3D animation which can be viewed in either in real time on a display of the vehicle or later from memory stored in a cloud.

SUMMARY

To animate a vehicle response to forces imparted to the vehicle during conveyance thereof over a course, sensor data are applied to a processor to define an instantaneous state of the vehicle. Sensor data may include wheel speed, yaw angle, vehicle speed, compass heading direction, GPS information, camera feed(s), LiDAR information, sonar information, altitude, temperature, conditions, and the like. Forces imparted to the vehicle are computed from temporal changes in the state of the vehicle. Wheel slip is determined by the processor from the computed forces. A 3D animation of the vehicle in motion under the influence of the wheel slip is rendered on a display. Wheel slip, pitch, roll and yaw values may be rendered as an overlay on the 3D animation.

DETAILED DESCRIPTION

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments. Particular quality or fitness of the examples indicated herein as exemplary is neither intended nor should be inferred.

Figure 1:
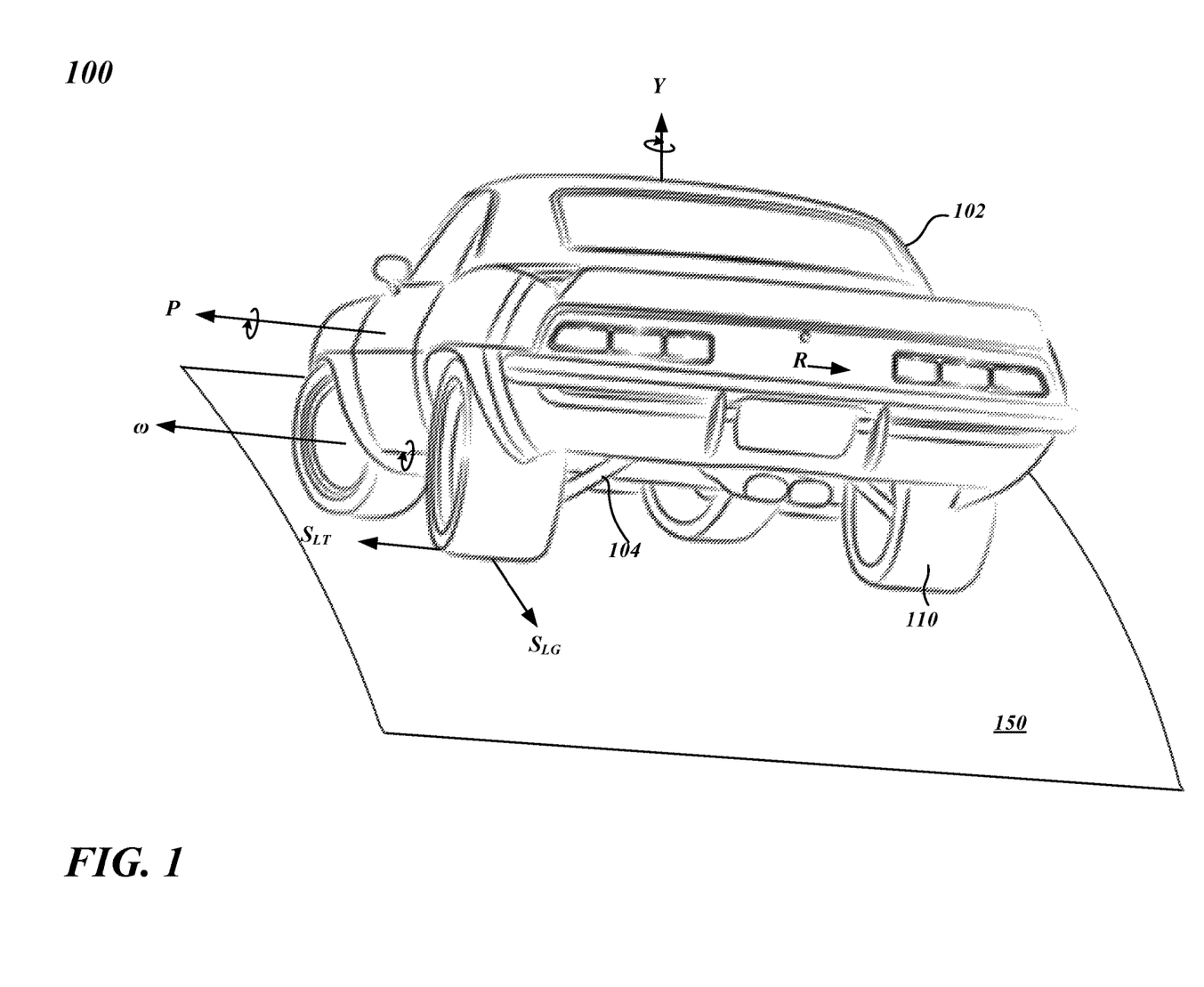
FIG. 1 is an illustration of a vehicle by which basic features of embodiments of the invention can be explained.

FIG. 1 is an illustration of a vehicle 100 by which basic features of embodiments of the invention can be explained. Vehicle 100 may take many different forms (e.g., sedans, trucks, sport utility vehicles, etc.), and may include a vehicle body 102, vehicle suspension 104 and wheels 110. As vehicle 100 traverses a course, representatively illustrated by off-road course 150, the spatial orientation of vehicle body 102 at the center of gravity thereof can be defined by rotation angles about three (3) principle axes: a pitch axis P, a roll axis R and a yaw axis Y. Vehicle 100 may propel itself over course 150 through frictional engagement between the vehicle wheels, representatively illustrated at wheel 110, and the surface of course 150. Wheel slip occurs when the frictional engagement is insufficient against forces applied to wheel 110. Longitudinal wheel slip SLG may occur when the torque on a wheel 110 rotating at a wheel speed ω exceeds friction, while lateral wheel slip $S_{LT}$ may occur when a lateral force, such as centrifugal force, Fc, applied to vehicle 100 as it is cornering, exceeds friction.

In (automotive) vehicle dynamics, slip is the relative motion between a tire and the road surface it is moving on. This slip can be generated either by the tire's rotational speed being greater or less than the free-rolling speed (usually described as percent slip), or by the tire's plane of rotation being at an angle to its direction of motion (referred to as slip angle).

The longitudinal slip, SLG is generally given as a percentage of the difference between the surface speed of the wheel compared to the speed between axle and road surface, as:

$$S_{LG} = \frac{v_x - r_e \Omega}{v_x} \times 100, \tag{1}$$

where Ω is the lateral component of the rotational speed of the wheel, $r_e$ is the wheel radius at the point of contact and $v_x$ is vehicle speed in the plane of the tire. A positive slip indicates that the wheels are spinning and a negative slip indicates that they are skidding. Locked brakes, $r_e\Omega=0$, means that slip=−1 and the wheels are sliding without rotating. Rotation with no velocity, $r_e\Omega\neq0$, means that slip=∞. angle).

The lateral slip, $S_{LT}$, of a tire is the angle, a, between the direction it is moving and the direction it is pointing. This can occur, for instance, in cornering, and is due to the deformation in the tire carcass and tread. Despite the name, no actual sliding is necessary for small slip angles. Sliding may occur, starting at the rear of the contact patch, as slip angle increases. The lateral slip angle, a, can be defined as:

$$\alpha = \arctan\left(\frac{v_y}{|v_x|}\right) \quad (2)$$

where $v_y$ and $v_x$ are motion vectors representing wheel speed in the plane of the tire.

In embodiments of the present invention, sensors may be distributed over vehicle 100 and signals generated thereby may be captured and used to define a vehicle state. The vehicle state and temporally-evolving sequences thereof may be provided to a data processor that creates a 3D representation of the vehicle that is consistent with the vehicle state data.

The system of the present disclosure aggregates all of the relevant data collected by a vehicle to produce a 3D reproduction of the vehicle in space. This 3D reproduction allows a user to watch their ride over a course, and then re-watch that ride at will.

In an off-roading vehicle implementation, for example, data collected at the vehicle may include wheel speed, yaw angle, vehicle speed, compass heading, GPS information, camera feed(s), LIDAR information, sonar information, radar information, and the like, all data being collected while the vehicle is engaged in off-roading activities. This data may then be sent to a data processor, including those implemented on a cloud server, where the data is aggregated. Using the aggregated data, a reproduction may be created that shows the vehicle traversing the off-road terrain in a 3D environment.

In certain embodiments, the focus of the 3D representation may be on the wheel slippage or yaw angle as the vehicle traverses the course. Coupling the data with a 3D production of the vehicle may enhance a user's sense of how well the vehicle was able to handle the off-road terrain. The user may visualize the vehicle wheel slippage in different environments and use this information to make future decisions as to safe handling of the vehicle in these environments.

In certain embodiments, one or more cameras may be used to create a more realistic reproduction of the vehicle's environment and enhance the 3D production generated by the aggregated data.

Figure 2:
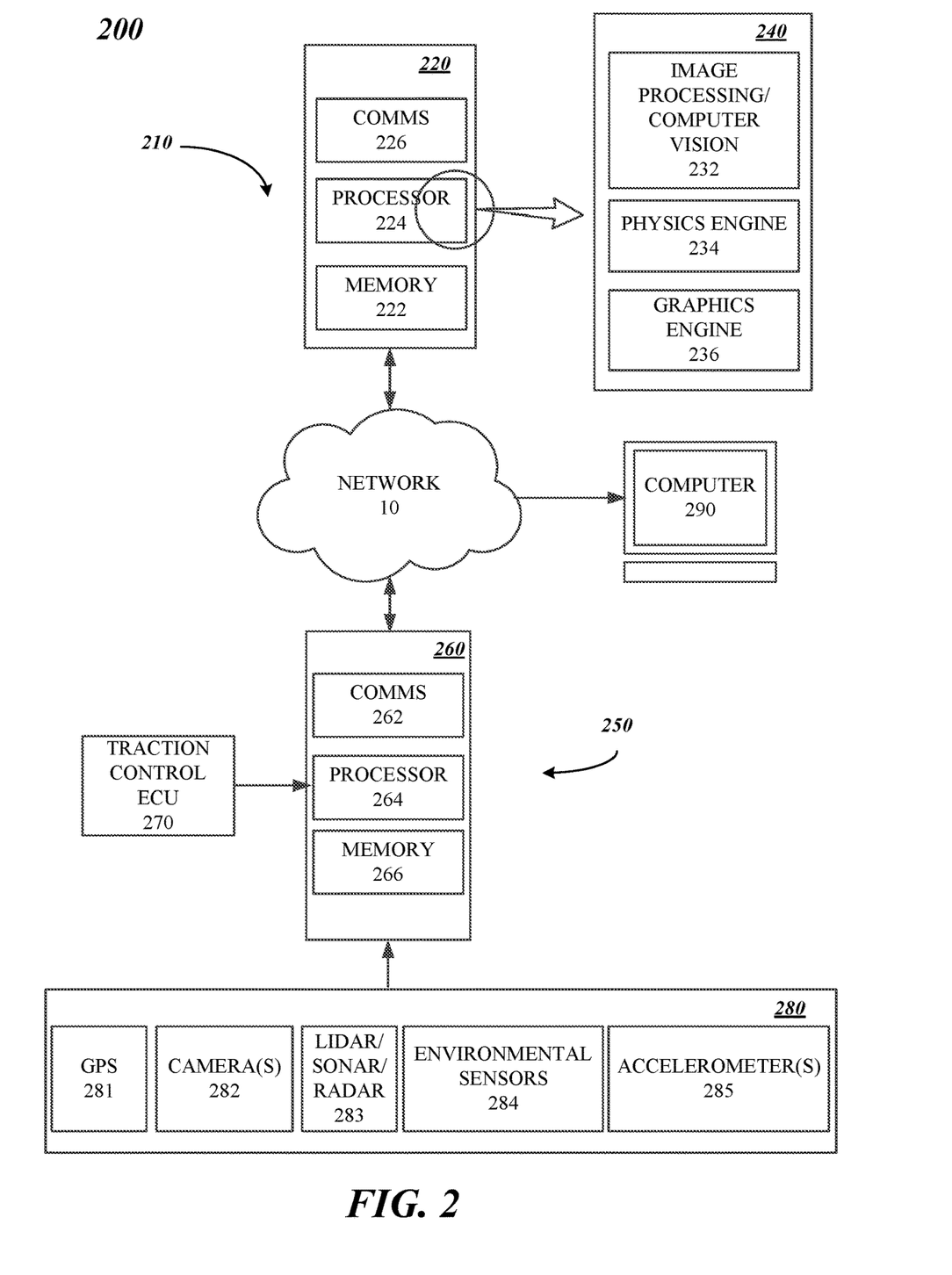
FIG. 2 is a schematic block diagram of an exemplary system by which the present invention can be embodied.

FIG. 2 is a schematic block diagram of an exemplary system 200 by which the present invention can be embodied. System 200 may comprise three (3) constituent components: a data ingest component 250, such as might be deployed on a vehicle; a data processing component 210, such as might be implemented on a server; and a display component 290. In the illustrated configuration, data ingest component 250, data processing component 210 and display component 290 are separated and communicate one with the others over a communication network 10. However, other configurations are contemplated. For example, data ingest component 250, data processing component 210 and display component 290 may be collocated at the vehicle being modeled.

As illustrated in FIG. 2, data ingest component 250 and data processing component 210 each comprise processing resources-processing resources 260 for data processing component 250 and processing resources 220 for data ingest component 210—by which functionality described herein may be realized. For example, processing resources 260 may include communications circuitry 262, processor circuitry 264 and memory circuitry 266 and processing resources 220 may include, communications circuitry 226, processor circuitry 224 and memory circuitry 222.

Data ingest component 250, which may be implemented on the vehicle being modeled, may include a sensor suite 280 by which a vehicle state may be ascertained. Sensor suite 280 may include a global positioning system receiver 281, one or more cameras 282, one or more LiDARs, radars, and sonars 283, environmental sensors 284 and accelerometers 285. The environmental sensors may be configured to measure at least one of humidity, temperature, wind speed, wind direction, altitude and a presence of rain, snow or sleet. Certain data may be provided by onboard electronic control units. For example, wheel speed of each of the wheels of the vehicle may be ascertained by traction control ECU 270.

Data processing component 210, which may be implemented on a cloud server, for example, is constructed or otherwise configured to identify forces on the vehicle from aggregated sensor data provided by data ingest component 250 and to render a 3D representation of the vehicle on display 290. To that end, processing resources 220 may be constructed or otherwise configured to implement an image processing/computer vision component 232 by which vehicle camera data are processed, a physics engine 234 to determine physical responses to applied forces based on physical laws, and a graphics engine 236 by which the 3D representation of the vehicle is rendered in memory and generated on display 290. In operation, sensor suite 280 and traction control ECU generate signals from which sensor data are generated. The sensor data may be conveyed to data processing component 210, where such data are aggregated. A vehicle state may be ascertained from the aggregated data and forces on the vehicle are determined from temporal sequences of the vehicle state. Those forces may be simulated as acting upon the 3D representation of the vehicle and any wheel slip arising from those forces is simulated in the 3D representation of the vehicle.

Figure 3:
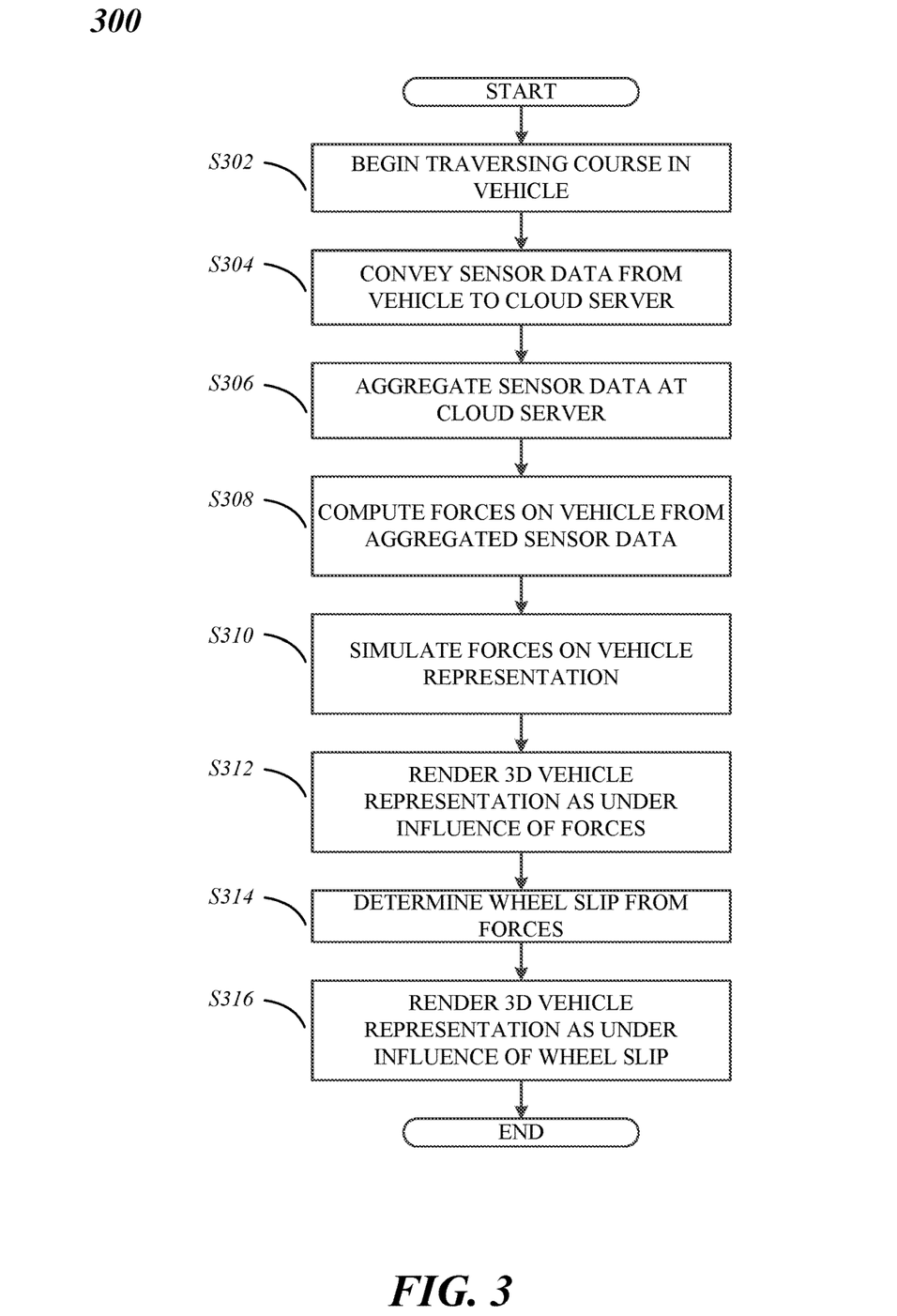
FIG. 3 is a flow diagram of an example animation process by which the present invention can be embodied.

FIG. 3 is a flow diagram of an example animation process 300 by which the present invention can be embodied. In operation step S302, the vehicle for which the 3D representation is to be realized begins traversing a course. In operation step S304, sensor data generated by sensors onboard the vehicle are conveyed to a cloud server at which a data processor is implemented. The sensor data are aggregated at the cloud server in operation step S306. In operation step S308, forces on the vehicle are computed from the aggregated sensor data and, in operation step S310, the computed forces are simulated as being applied to 3D representation of the vehicle. In operation step S312, the 3D vehicle representation is rendered on a display as being under the influence of the forces. In operation step S314, wheel slip is determined from the computed forces and, in operation step S316, the 3D vehicle representation is rendered as being under the influence of the determined wheel slip.

Figure 4:
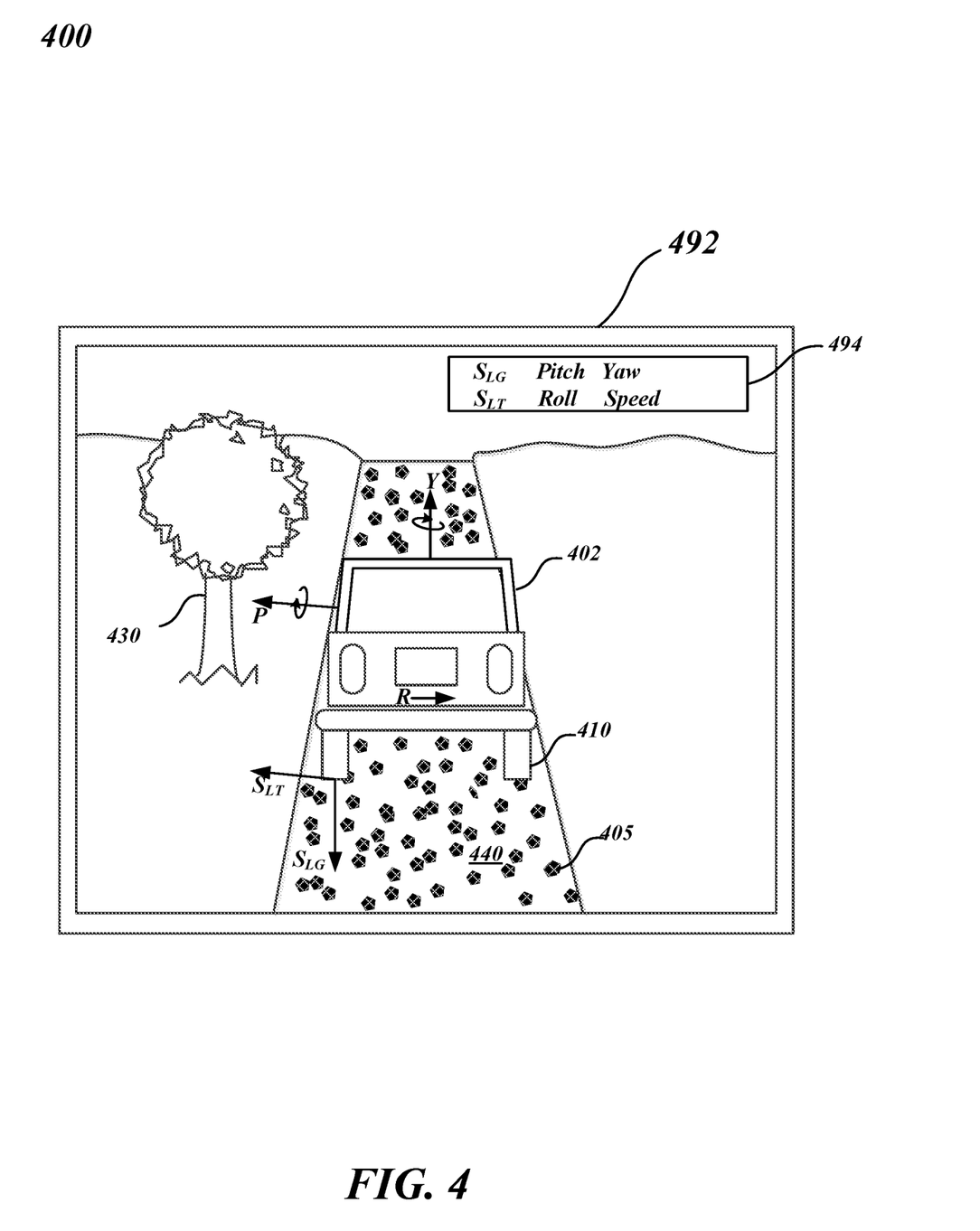
FIG. 4 is a schematic illustration of a display having rendered thereon an animated 3D representation of a vehicle.

FIG. 4 is a schematic illustration 400 of a display 492 upon which is rendered an animated 3D representation of a vehicle. The vehicle 402 may be travelling on a course 440 having a rough surface, covered by rocks or gravel 405. In this situation, the frictional forces on the tires vary, depending on the density, size, degree of embedding, etc. of the rocks or gravel. The variation of the frictional forces causes longitudinal wheel slip, SLG and lateral wheel slip, $S_{LT}$, which are detected by vehicle sensors 280 and traction control ECU 270. Additionally, due to the uneven ground surface, the pitch P, a roll R and a yaw Y axes will tilt. This tilt can be determined by accelerometers 285 and/or by information gathered by cameras 282 and LiDAR, sonar and radar sensors 283 when applied to the image processing/computer vision unit 232, which can compare the information to a static image. Physics engine 234 determines the physical forces, such as frictional components, operating on the wheels and the vehicle body and this information can be rendered as an overlay on the display 492. The longitudinal wheel slip can be calculated using equation (1) and the lateral wheel slip angle, a, can be calculated using equation (2) above, once the wheel velocities, $v_x$ and $v_y$ and the rotational speed of the wheel is determined by the physics engine 234.

Data collection by cameras 282, LiDAR, sonar and radar sensors 283 and environment sensors may be used by the image processing/computer vision unit 232 to depict the environment surrounding the vehicle, such as the course, field, and tree 430.

The inset 494 is an overlay which shows the values of SLG, SLT, pitch, roll, yaw and the vehicle speed. However, these values can also be shown anywhere on the display and are not limited to SLG, SLT, pitch, roll, yaw and the vehicle speed, but may be any measurable values helpful in enabling a driver to make informed driving decisions. For example, the display screen 492 or the inset 494 may show environmental conditions, such as wind speed, rain, snow or sleet, the vehicle speed and location coordinates or the like. The values of SLG, SLT, pitch, roll, yaw may be shown anywhere on the display, e.g. at the wheels or on the vehicle as shown in FIG. 4.

Figure 5:
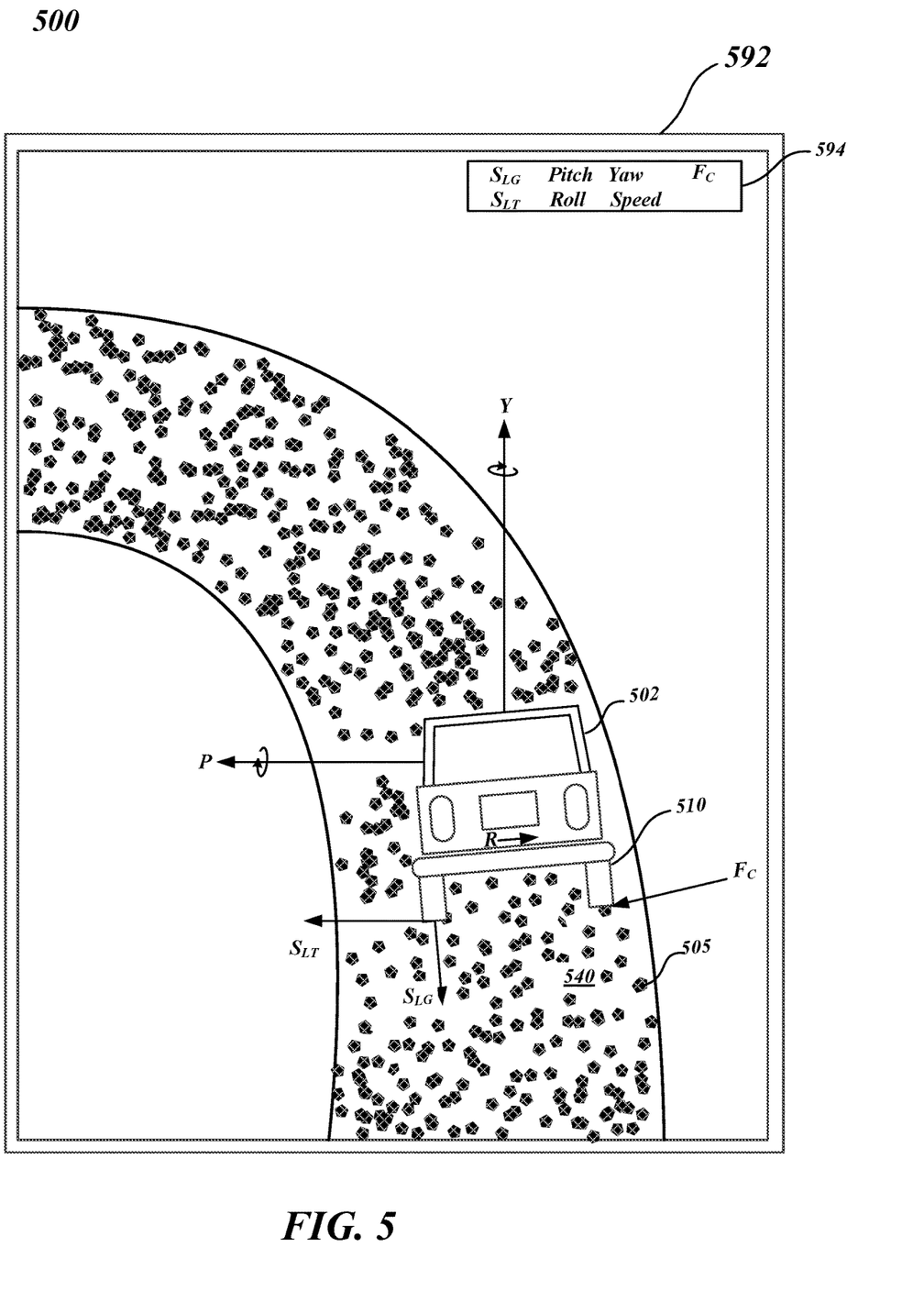
FIG. 5 is a schematic illustration of a display having rendered thereon an animated 3D representation of a vehicle experiencing lateral wheel slip.

FIG. 5 is a schematic illustration 500 of a display 592 upon which is rendered an animated 3D representation of a situation where the vehicle is cornering on an off-road surface. Off-road course 540 is depicted as a gravel (505) road with a sharp left curve. Centrifugal forces, Fc, act upon the vehicle wheels (e.g., 510) as the vehicle attempts to negotiate the curve, causing lateral slip, SLG. Additionally, the gravel causes varying frictional forces beneath the tires, so the wheels will experience longitudinal slip, SLG, when slowing for the curve. Viewing these frictional forces in real time on the display allows the driver to compensate by adjusting the vehicle speed and steering. When viewing in real time, the video image may experience delays (a.k.a. "latency") in the video feed which vary based on processing/calculation speeds, data transmission rates, etc. However, the delay may be reduced such that it is unrecognizable to the human eye. Additionally, the driver can watch the animated videos at a later time to make judgments about the ability of the vehicle to handle the off-roading conditions.

Figure 6:
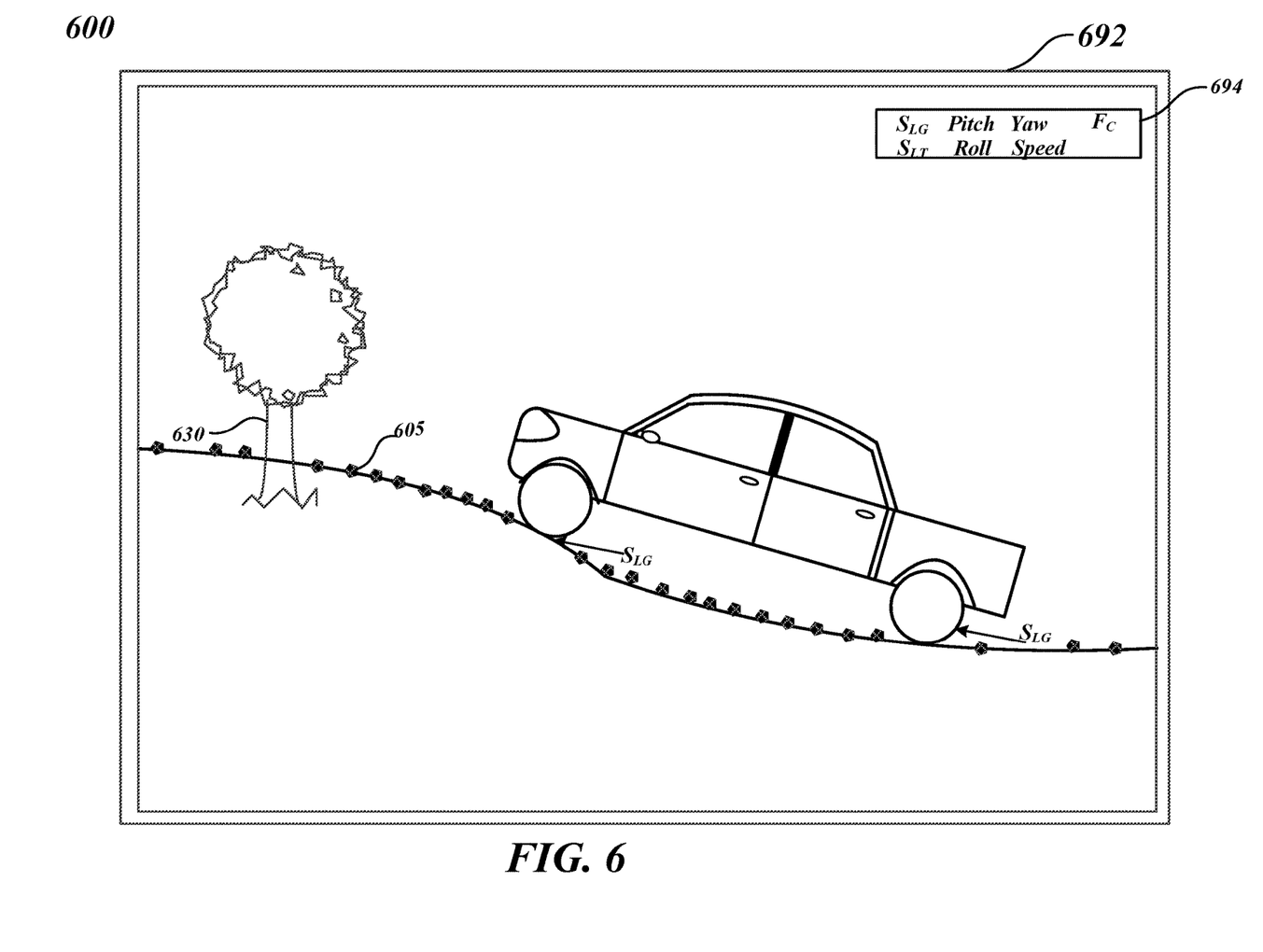
FIG. 6 is a schematic illustration of a display having rendered thereon an animated 3D representation of a vehicle experiencing longitudinal wheel slip.

FIG. 6 is a schematic illustration 600 of a display 692 upon which is rendered an animated 3D representation of a vehicle which is driving up a hill on an off-road surface. The off-road surface may be sand, gravel, mud, turf or rocks 605. The off-road surface is not limited to sand, gravel, mud, turf or rocks, and may be any off-road surface. Additionally, the course may be a track, roadway, highway or any surface on which an automotive vehicle can travel. The longitudinal slip, SLG, is illustrated as operating upon the wheels. The longitudinal slip can be measured by accelerometers (282, FIG. 2) and through the traction control ECU (270, FIG. 2). This information is transmitted to the physics engine 234 to determine the longitudinal slip with other forces and rendered on an overlay on display 692.

The displays 492, 592 of FIG. 4, FIG. 5 and FIG. 6 may be rendered in real time on an in-vehicle display. The examples of FIGS. 4-6 by no means limit the animation of the vehicle performance, which may have many variations, modifications and alternatives.

The first embodiment is drawn to a method of animating vehicle response to forces imparted to the vehicle during conveyance thereof over a course, the method comprising accepting, by a processor, sensor data that defines an instantaneous state of the vehicle, computing, by the processor, the forces imparted to the vehicle from temporal changes in the state, determining, by the processor, wheel slip from the computed forces, and rendering, on a display device, a graphical representation of the vehicle as being in motion under influence of the wheel slip.

Rendering the graphical representation comprises rendering the graphical representation of the vehicle to have separately movable parts, determining motion vectors of respective movable parts of the vehicle under the influence of the wheel slip, and rendering a representation of the course on the display device so as to indicate relative motion between the graphical representation of the vehicle and the representation of the course according to the determined motion vectors.

The method further comprises determining the motion vectors of wheels of the vehicle, the motion vectors of the wheels being indicative of either or both longitudinal wheel slip and lateral wheel slip, and rendering the graphical representation of the vehicle to include simulated motion of the wheels in accordance with the motion vectors thereof.

The method further comprises overlaying the graphical representation with values representing the longitudinal and lateral wheel slip, and overlaying the graphical representation with values representing at least one of a wheel speed, a vehicle speed, a compass heading direction, GPS information, an altitude, a temperature and a weather condition.

The method further comprises accepting, within the sensor data, accelerometer data from which the forces are resolvable along pitch, roll and yaw axes, determining the lateral wheel slip from the forces resolved along the yaw axis, and overlaying the graphical representation with values representing pitch, roll and yaw angles.

The method further comprises accepting, within the sensor data, torque control data, deriving the motion vectors from the torque control data, and determining longitudinal wheel slip.

The method further comprises calculating, by the processor, the longitudinal wheel slip from the motion vectors, by $$S_{LG} = \frac{v_x - r_e \Omega}{v_x} \times 100,$$

where $\Omega$ is a lateral component of a rotational speed of a wheel, $r_e$ is a wheel radius at the point of contact and $v_x$ is a motion vector representing a wheel speed in a plane of a tire.

The method further comprises calculating, by the processor, a lateral wheel slip angle from the motion vectors, by $$\alpha = \arctan\left(\frac{v_y}{|v_z|}\right)$$

where $v_y$ and $v_x$ are motion vectors representing wheel speed in a plane of a tire.

The second embodiment describes a system for animating vehicle response to forces imparted to a vehicle during conveyance thereof over a course, comprising a vehicle including a data ingest component operatively connected to receive measurement data from a vehicle sensor suite, a data processing component implemented on a remote computer wirelessly connected to the data ingest component, a display component configured to render an animated 3D display of the vehicle in motion, the animated 3D display including representations of longitudinal and lateral wheel slip.

The data ingest component comprises first communications circuitry, first processing circuitry operatively connected to a sensor suite and first memory circuitry; and a traction control electronic control unit operatively connected to the first processor and configured to generate traction control signals, and an input configured to receive information gathered by the sensor suite.

The sensor suite includes at least one camera configured to record images of an environment surrounding the vehicle, at least one of a LiDAR, radar and sonar sensor configured to collect LiDAR, radar and sonar readings of the environment surrounding the vehicle, at least one environmental sensor configured to measure at least one of humidity, temperature, wind speed, wind direction, altitude and a presence of rain, snow or sleet, a GPS unit configured to provide location coordinates, and at least three accelerometers configured to measure yaw, pitch and roll angles of the vehicle during conveyance over the course.

The data processing component comprises second communications circuitry configured to communicate wirelessly with first communications circuitry, second processing circuitry, and second memory circuitry.

The second processing circuitry comprises an image processing and computer vision component configured for processing the measurements gathered by the sensor suite and the traction control signals, a physics engine configured to determine physical responses of the vehicle based on the measurements gathered by the sensor suite and the traction control signals, and a graphics engine configured to render an animated 3D representation of the vehicle in motion and the surrounding environment into the second memory circuitry.

The second communication circuitry is configured to communicate the 3D representation to the display component, and the graphics engine is configured to render the animated 3D representation onto the display component.

The system further comprises wherein the physics engine is configured to calculate longitudinal and lateral slip values from the physical responses, and wherein the graphics component is further configured to render the longitudinal and lateral slip values as an overlay of longitudinal and lateral slip values onto the animated 3D representation.

The system further comprises wherein the physics engine is configured to compute yaw, pitch and roll angles from the physical responses, and wherein the graphics component is further configured to render the yaw, pitch and roll angles as an overlay onto the animated 3D representation.

The system further comprises wherein the graphics component is further configured to render at least one value of humidity, temperature, wind speed, wind direction and altitude, the location coordinates and the presence of rain, snow or sleet values as an overlay onto the animated 3D representation.

The third embodiment describes a non-transitory computer readable medium having instructions stored therein that, when executed by one or more processors, cause the one or more processors to perform a method of animating vehicle response to forces imparted to the vehicle during conveyance thereof over a course, the method comprising accepting, by a processor, sensor data that defines an instantaneous state of the vehicle, computing, by the processor, the forces imparted to the vehicle from temporal changes in the state, determining, by the processor, wheel slip from the computed forces, and rendering, on a display device, a graphical representation of the vehicle as being in motion under influence of the wheel slip.

The non-transitory computer readable medium method further comprises rendering the graphical representation of the vehicle to have separately movable parts, determining motion vectors of respective movable parts of the vehicle under the influence of the wheel slip, rendering a representation of the course on the display device so as to indicate relative motion between the graphical representation of the vehicle and the representation of the course according to the determined motion vectors, determining the motion vectors of wheels of the vehicle, the motion vectors of the wheels being indicative of either or both longitudinal wheel slip and lateral wheel slip, and rendering the graphical representation of the vehicle to include simulated motion of the wheels in accordance with the motion vectors thereof.

The non-transitory computer readable medium method further comprises overlaying the graphical representation with values representing the longitudinal and lateral wheel slip, and overlaying the graphical representation with values representing at least one of a wheel speed, a vehicle speed, a compass heading direction, GPS information, an altitude, a temperature and a weather condition.

The system 200 may be implemented in a client-server system, database system, virtual desktop system, distributed computer system, cloud-based system, clustered database, data center, storage area network (SAN), or in any other suitable system, for example in a system designed for the provision of Software-as-a-Service (SaaS), such as a cloud data center or hosted web service.

The storage areas and memory described herein may be implemented by any quantity of any type of conventional or other memory or storage device, and may be volatile (e.g., RAM, cache, flash, etc.), or non-volatile (e.g., ROM, hard-disk, optical storage, etc.), and include any suitable storage capacity.

The processors are, for example, one or more data processing devices such as microprocessors, microcontrollers, systems on a chip (SOCs), or other fixed or programmable logic, that executes instructions for process logic stored the memory. The processors may themselves be multi-processors, and have multiple CPUs, multiple cores, multiple dies comprising multiple processors, etc.

The networks described herein represents any hardware and/or software configured to communicate information via any suitable communications media (e.g., WAN, LAN, Internet, Intranet, wired, wireless, etc.), and may include routers, hubs, switches, gateways, or any other suitable components in any suitable form or arrangement. The various components of the system may include any conventional or other communications devices to communicate over the networks via any conventional or other protocols, and may utilize any type of connection (e.g., wired, wireless, etc.) for access to the network.

The system may include additional servers, clients, and other devices not shown, and individual components of the system may occur either singly or in multiples, or for example, the functionality of various components may be combined into a single device or split among multiple devices. It is understood that any of the various components of the system may be local to one another, or may be remote from and in communication with one or more other components via any suitable means, for example a network such as a WAN, a LAN, Internet, Intranet, mobile wireless, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" "component" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a solid state disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, a phase change memory storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

It is to be understood that the software for the computer systems of the present invention embodiments may be implemented in any desired computer language and could be developed by one of ordinary skill in the computer arts based on the functional descriptions contained in the specification and flow charts illustrated in the drawings. By way of example only, the software may be implemented in the C++, Java, P1/1, Fortran or other programming languages. Further, any references herein of software performing various functions generally refer to computer systems or processors performing those functions under software control.

The computer systems of the present invention embodiments may alternatively be implemented by any type of hardware and/or other processing circuitry. The various functions of the computer systems may be distributed in any manner among any quantity of software modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, method and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometime be executed in the reverse order, depending on the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

The invention claimed is:

1. A method of animating vehicle response to forces imparted to a vehicle during conveyance thereof over a course, the method comprising:
    accepting, by a processor, sensor data that defines an instantaneous state of the vehicle;
    computing, by the processor, the forces imparted to the vehicle from temporal changes in the state;
    determining, by the processor, wheel slip from the computed forces;
    determining, by the processor, longitudinal wheel slip and lateral wheel slip based on a speed of the wheels and the computed forces; and
    rendering, on a display device, an animation of the vehicle as being in motion under influence of the wheel slip, the animation of the vehicle in motion including simulated motion of wheels of the vehicle whose instantaneous state is defined by the sensor data and an animation of the wheel slip, determined from the computed forces, as acting on the wheels,
    wherein the animation of the wheel slip as acting on the wheels is overlayed with the longitudinal wheel slip and the lateral wheel slip.

2. The method of claim 1, wherein rendering the animation comprises:
    rendering the animation of the vehicle to have separately movable parts;
    determining motion vectors of respective movable parts of the vehicle under the influence of the wheel slip; and
    rendering a representation of the course on the display device so as to indicate relative motion between the animation of the vehicle and the representation of the course according to the determined motion vectors.

3. The method of claim 2, wherein:
    of the movable parts include the wheels of the vehicle,
    the motion vectors of the wheels are indicative of either or both the longitudinal wheel slip and the lateral wheel slip, and
    the method further comprises rendering the animation of the vehicle to include the simulated motion of the wheels in accordance with the motion vectors thereof.

4. The method of claim 3, further comprising:
    Overlaying the animation with values representing the longitudinal and/or the lateral wheel slip; and
    overlaying the animation with values representing at least one of a wheel speed, a vehicle speed, a compass heading direction, GPS information, an altitude, a temperature, or a weather condition.

5. The method of claim 4, further comprising:
    accepting, within the sensor data, accelerometer data from which the forces are resolvable along pitch, roll, and yaw axes;
    determining the lateral wheel slip from the forces resolved along the yaw axis; and
    overlaying the animation with values representing pitch, roll, and yaw angles.

6. The method of claim 5, further comprising:
    accepting, within the sensor data, torque control data;
    deriving the motion vectors from the torque control data; and
    determining the longitudinal wheel slip.

7. The method of claim 6, further comprising:
    calculating, by the processor, the longitudinal wheel slip from the motion vectors, by:

$$SLG = \frac{vx - re\Omega}{vx} \times 100,$$

where $\Omega$ is a lateral component of a rotational speed of a wheel, $r_e$ is a wheel radius at a point of contact, and $v_x$ is a motion vector representing a wheel speed in a plane of a tire.

8. The method of claim 6, further comprising:
    calculating, by the processor, a lateral wheel slip angle from the motion vectors, by:

$$\alpha = \arctan\left(\frac{v_y}{|v_z|}\right)$$

where $v_y$ and $v_x$ are motion vectors representing wheel speed in a plane of a tire.

9. A non-transitory computer readable medium having instructions stored therein that, when executed by one or more processors, cause the one or more processors to perform a method of animating vehicle response to forces imparted to a vehicle during conveyance thereof over a course, the method comprising:
    accepting, by a processor, sensor data that defines an instantaneous state of the vehicle;
    computing, by the processor, the forces imparted to the vehicle from temporal changes in the state;
    determining, by the processor, wheel slip from the computed forces;
    determining longitudinal wheel slip and lateral wheel slip based on a speed of the wheels and the computed forces; and
    rendering, on a display device, an animation of the vehicle as being in motion under influence of the wheel slip, the animation of the vehicle in motion including simulated motion of wheels of the vehicle whose instantaneous state is defined by the sensor data and an animation of the wheel slip, determined from the computed forces, as acting on the wheels,
    wherein the animation of the wheel slip as acting on the wheels is overlayed with the longitudinal wheel slip and the lateral wheel slip.

10. The non-transitory computer readable medium of claim 9, wherein the method further comprises:
rendering the animation of the vehicle to have separately movable parts;
determining motion vectors of respective movable parts of the vehicle under the influence of the wheel slip;
rendering a representation of the course on the display device so as to indicate relative motion between the animation of the vehicle and the representation of the course according to the determined motion vectors;
determining motion vectors of the wheels of the vehicle, the motion vectors of the wheels being indicative of either or both longitudinal wheel slip and lateral wheel slip; and
rendering the animation of the vehicle to include the simulated motion of the wheels in accordance with the motion vectors thereof.

11. The non-transitory computer readable medium of claim 10, wherein the method further comprises:
overlaying the animation with values representing the longitudinal and/or the lateral wheel slip; and
overlaying the animation with values representing at least one of a wheel speed, a vehicle speed, a compass heading direction, GPS information, an altitude, a temperature, and a weather condition.

* * * * *